UNITED STATES PATENT OFFICE 2,265,907

PRODUCTION OF PHOTOGRAPHIC DESENSITIZING COMPOUNDS

John David Kendall, Ilford, England, assignor to Ilford Limited, Ilford, England, a British company No Drawing. Application May 5, 1938, Serial No. 206,269. In Great Britain May 8, 1937

11 Claims. (Cl. 260—240)

The invention relates to the production of photographic desensitizing compounds.

It is known that many organic dyestuffs have the property of decreasing the light sensitivity of silver halide photographic emulsions, and they are used, for example, to facilitate the development of photographic emulsions, particularly so-called panchromatic emulsions, by treating an exposed emulsion with the desensitizing dyestuff so that it can be exposed to quite bright lights without danger of "fogging." In some circumstances it is desirable to employ these desensitizing compounds to reduce the light sensitivity of unexposed silver halide emulsions.

In my paper entitled "La Chimie des Sensibilisateurs, Desensibilisateurs et Developpateurs organiques pour les Halosels d'Argent," which was read before the Photographic Congress in Paris in 1935, I indicated that many known desensitizers contain a dicationoid system as shown by the general formula:

$$\beta = C - (C = C)_n - C = \beta'$$

in which $n$ is a whole number or nought, and $\beta$ and $\beta'$ may represent O, S, Se, N, etc., as in cationoid groups.

As a result of further investigations I have now found a method of preparing a new group of compounds obeying the above-mentioned general formula and having good desensitizing properties.

The process for the production of the compounds according to the present invention comprises condensing a compound containing a heterocyclic nitrogen ring having a substituent aldehyde group attached directly to a cyclic carbon atom in the $\alpha$ or $\lambda$ position to a nitrogen atom of the heterocyclic ring either with a quaternary ammonium salt of a heterocyclic nitrogen compound having a substituent methyl group attached directly to a cyclic carbon atom in the $\alpha$ or $\lambda$ position to a nitrogen atom in the heterocyclic ring or with a compound having a heterocyclic nitrogen ring containing a reactive methylene group.

The process is preferably carried out by heating the compounds together in the presence of a condensing agent, for example piperidine. It is believed that the reaction may be illustrated by the two following general equations, the first equation illustrating the use of a quaternary ammonium salt of a heterocyclic nitrogen compound having a substituent reactive methyl group, and the second equation illustrating the use of a heterocyclic nitrogen ring compound containing a reactive methylene group. In the equations $n=0$ or 1, R=alkyl, aryl or aralkyl, R'=H or alkyl, X=an acid radical, Y=a divalent atom or group, and D and D'=the remainder of heterocyclic rings.

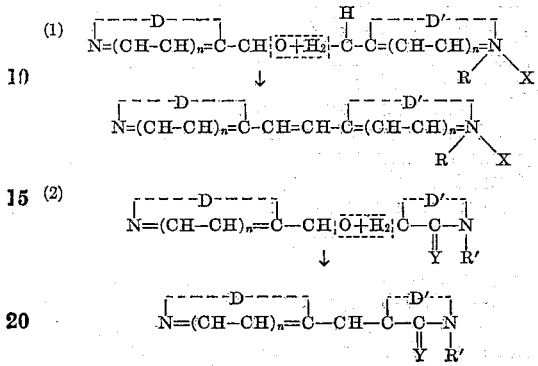

When a quaternary ammonium salt of a heterocyclic nitrogen compound is employed in the process, the products obtained will be salts, but when heterocyclic nitrogen bases having reactive methylene groups are employed the products will be bases.

In the case of the reaction with a quaternary ammonium salt of a heterocyclic nitrogen compound it is preferred to use the alkyl-p-toluene sulphonates. The resulting salt may be converted into any other desired salt, for example the iodide, by double decomposition with a suitable alkali salt in a suitable solvent.

Examples of compounds containing heterocyclic rings which are substituted with aldehyde groups and also those substituted with reactive methyl groups are those compounds commonly used in the preparation of the various cyanine dyes, for example, pyridines, quinolines, naphthaquinolines and their homologues; substituted or unsubstituted thiazoles, thiazolines, selenazoles, selenazolines, oxazoles, oxazolines, and their homologues, including those of the benzene and naphthalene and homologous series; diazines, such as diazoles, pyrimidines and other heterocyclic nitrogen compounds containing two nitrogen atoms in one ring as described in British Patent No. 425,609, filed September 12, 1933.

Examples of compounds having heterocyclic nitrogen rings containing reactive methylene groups which may be used in accordance with the present invention are the substituted and unsubstituted 2:4-diketotetrahydrothiazoles, rhodanines, and their selenazole and oxazole analogues, pyrazalones, true and pseudo-hydantoins, and the N-alkyl- or N-aryl- substituted derivatives of the above compounds.

Many of the compounds of the invention are soluble in water and in spirit and have very low tinctorial power, some being almost colourless. They are powerful desensitizers for both colour-sensitized and non-colour-sensitized photographic emulsions and are particularly suitable for this purpose as they have no tendency to stain the emulsions undesirably, a disadvantage of the desensitizing compounds of the phenosafranine type at present in use. As an example, when used for bathing, a one in fifty-thousand aqueous solution of diquinolyl-ethylene methiodide is a much more powerful desensitizer for both colour-sensitized and non-colour-sensitized emulsions than a one in five-thousand solution of phenosafranine as normally used, and as it is almost colourless diquinolyl-ethylene methiodide does not stain the emulsion whilst phenosafranine gives noticeable stains.

The compounds of the invention may conveniently be incorporated in the emulsion by bathing the emulsion in a solution; in some cases, however, it may be desirable to incorporate the compound in the emulsion during its preparation prior to coating on a support. One or more of the compounds may be used in either case.

The following specific examples, which are given by way of example only, illustrate the method of producing the compounds in accordance with the present invention:

Example I 0.39 gram of quinoline-2-aldehyde and 0.76 gm. of 1-methyl-benzthiazole ethiodide were dissolved in 20 ccs. of ethyl alcohol. 2 drops of piperidine were added and the solution was gently boiled on a water bath under a reflux condenser for about one hour. The solution was then poured into a beaker of water and cooled with ice. A yellow crystalline precipitate was formed which was filtered off, washed with ethyl alcohol, benzene and ether and recrystallized from ethyl alcohol as orange brown crystals, melting at 201° C. with decomposition.

Example II 0.40 gm. of quinoline-2-aldehyde and 0.74 gm. of quinaldine methiodide were dissolved in 20 ccs. of ethyl alcohol. 2 drops of piperidine were added and the mixture was gently boiled on a water bath under a reflux condenser for about ¾ hour. The resulting mixture was then poured into a beaker of water and cooled with ice when a pale yellowish precipitate was formed. This precipitate was filtered off, washed with ethyl alcohol, benzene and ether and then recrystallized from ethyl alcohol as orange crystals melting at 232° C. with decomposition.

Example III 1.49 gms. of 1-methylbenzthiazole and 1.88 gms. methyl-p-toluene sulphonate were fused together at 130–140° C. for 2 hours. The mixture was allowed to cool and was dissolved in 25 ccs. of ethyl alcohol together with 1.57 gms. of quinoline-2-aldehyde. 5 drops of piperidine were then added and the mixture was gently boiled on a water bath under a reflux condenser for about one hour. The resulting solution was poured into a beaker containing an aqueous solution of potassium bromide and allowed to stand. A sticky solid mass separated out and was removed from the mother liquor and treated with warm ethyl alcohol when a yellow solid was left. This solid was filtered off, washed with ethyl alcohol, benzene and ether and recrystallized from 50% aqueous ethyl alcohol as yellow crystals, melting at 193° C. with decomposition.

Example IV 2.94 gms. of N-methyl-rhodanic acid and 3.16 gms. of quinoline-2-aldehyde were dissolved in 50 ccs. of ethyl alcohol with the aid of gentle heat on a water bath. 10 drops of piperidine were added and the mixture was boiled gently for 15 minutes on a water bath under a reflux condenser. A crystalline solid separated out and this solid was filtered off, washed with ethyl alcohol and recrystallized from methyl alcohol as yellow crystals melting at 262° C.

Example V 22.6 gms. of 1-methyl-5-nitrobenzthiazole were heated with 18.8 gms. of methyl-p-toluene sulphonate for 3½ hours at 150–160° C. The mixture was then allowed to cool and 15.7 gms. of quinoline-2-aldehyde and 30 ccs. of ethyl alcohol were added and the mixture was warmed until the solid was dissolved. 3 ccs. of piperidine were then added and the mixture was gently boiled for one hour on a water bath under a reflux condenser. The mixture was then allowed to cool when a dark solid was precipitated. This solid was filtered off and washed repeatedly with ethyl alcohol and hot benzene alternately and finally with ethyl alcohol leaving 12.9 gms. of a dark solid melting at 220° C. with decomposition.

Example VI 8.4 gms. of N-ethyl-rhodanic acid and 7.9 gms. of quinoline-2-aldehyde were dissolved together in 150 ccs. of ethyl alcohol with warming. 1 cc. of piperidine was then added and the solution was gently boiled under a reflux condenser for ¼ hour, and then allowed to cool. The solid which commenced to separate out immediately on the addition of the piperidine was filtered off, washed and dried and then recrystallized from 3 litres of ethyl alcohol yielding 12.5 gms. of golden yellow needles melting at 198° C.

Example VII 6.7 gms. of rhodanic acid and 7.9 gms. of quinoline-2-aldehyde were dissolved in 150 ccs. of ethyl alcohol with warming. 1 cc. of piperidine was then added and the mixture was boiled gently under a reflux condenser for about ¼ hour and then allowed to cool. The solid which separated out was filtered off, washed and purified by boiling with 400 ccs. of ethyl alcohol leaving 0.55 gm. of thin brown yellow needles melting at 274° C.

Example VIII 15 gms. of 2.3.3-trimethylindolenine methiodide and 7.9 gms. of quinoline-2-aldehyde were gently boiled for ¾ hour under a reflux condenser with a mixture of 50 ccs. of glacial acetic acid and 150 ccs. of ethyl alcohol. The solid dissolved and the liquid turned an orange colour the later became darker in colour when some solid separated out. The solution was then diluted with water and allowed to stand. A solid substance separated out and was filtered off and washed and recrystallized from 100 ccs. of ethyl alcohol yielding 8.3 gms. of short needle shaped crystals melting at 202° C.

Example IX 7.9 gms. of toluquinaldine were heated with 9.4 gms. of methyl-p-toluene sulphonate for 3½ hours at 130–140° C. The mixture was then allowed to cool and 7.9 gms. of quinoline-2-aldehyde and 150 ccs. of ethyl alcohol were added and the mixture was warmed until the solids dissolved. 1 cc. of piperidine was then added and the mixture was gently boiled under a reflux condenser for about one hour. The mixture was then allowed to cool and was diluted with potassium iodide solution and then allowed to stand. The solid which separated out was then filtered off, washed and recrystallized from 300 ccs. of ethyl alcohol yielding 2.6 gms. of brownish yellow needle crystals, melting at 212° C. with decomposition.

Example X 7.5 gms. of 1-methylbenzthiazole and 9.4 gms. of methyl-p-toluene sulphonate were heated together for 3 hours at 130–140° C. The mixture was allowed to cool and 8.6 gms. of 6-methyl-quinoline-2-aldehyde and 150 ccs. were added and the mixture was warmed gently until the solid dissolved. 1 cc. of piperidine was added and the mixture was gently boiled under a reflux condenser for about one hour. The mixture was allowed to cool and was diluted with an aqueous solution of potassium bromide and allowed to stand. The solid which separated out was filtered off, washed and recrystallized from 20 ccs. of water yielding 3.3 gms. of yellow needles melting at 193° C. with decomposition. The filtrate was treated with potassium iodide and a further 1.9 gms. of recrystallised red brown rhombs of the iodide salt melting at 190° C. with decomposition were obtained.

Example XI 7.2 gms. of quinaldine were heated together with 9.4 gms. of methyl-p-toluene sulphonate for 3½ hours at 130–140° C. The mixture was then allowed to cool and 8.6 gms. of 6-methyl-quinoline-2-aldehyde and 150 ccs. of ethyl alcohol were added and the mixture was gently warmed until the solids dissolved. 1 cc. of piperidine was then added and the mixture was gently boiled under a reflux condenser for about one hour. The mixture was then cooled and diluted with aqueous potassium iodide solution and allowed to stand. The solid which separated out was filtered off, washed and recrystallized from 100 ccs. of ethyl alcohol yielding 7.5 gms. of long orange brown rhombs melting at 210° C. with decomposition.

Example XII 9.4 gms. of 6-ethoxyquinaldine were fused with 9.4 gms. of methyl-p-toluene sulphonate for four hours at 140–150° C. The mixture was allowed to cool and 7.9 gms. of quinoline-2-aldehyde and 150 ccs. of ethyl alcohol were added and the whole was warmed until the solid dissolved. 1 cc. of piperidine was then added and the mixture was gently boiled under a reflux condenser for about one hour. The mixture was then allowed to cool and was diluted with a warm aqueous potassium iodide solution. The solid which separated out was filtered off, washed and recrystallized from 100 ccs. of ethyl alcohol yielding 1.6 gms. of a yellow solid melting at 210° C. with decomposition.

Example XIII

*1-ω-(2-quinolyl)-vinyl-4-quinoline-methiodide*

14.25 gms. of lepidine-methiodide were dissolved in 500 ccs. of ethyl alcohol and 7.8 gms. of quinoline-2-aldehyde were added. When the solids were all dissolved, 2 ccs. of piperidine were added and the mixture was well shaken and then allowed to stand, when greenish yellow crystals slowly separated out and the solution became brown in colour.

After standing for one hour the crystals which formed were filtered off and washed with ethyl alcohol, yielding 11 gms. of crystals melting at 168–169° C. Some of these crystals were recrystallised from alcohol to give pale green leaflets melting at 175° C.

Example XIV

*1-ω-(2-quinolyl)-vinylbenzselenazole-methiodide*

3.38 gms. of 1-methylbenzselenazole-methiodide were heated with 0.78 gm. of quinoline-2-aldehyde, 30 ccs. of dry ethyl alcohol and 5 drops of piperidine on a water bath for about one hour. The methiodide dissolved up and an orange solid separated out. After continuing the heating for on hour the mixture was poured into a beaker of water and on cooling the contents of this beaker a tarry substance separated out on the orange solid. The solution was warmed up again and filtered hot leaving 0.16 gm. of brownish yellow crystals which were well washed with ethyl alcohol and ether and melted at 200–202° C. This residue was purified by boiling with 30 ccs. of dry ethyl alcohol and then filtered leaving 0.15 gm. of yellowish-brown crystals, melting at 203° C. with decomposition.

Example XV 1.5 gms. of 1-methylbenzthiazole-ethiodide were heated with 0.78 gm. of quinoline-4-aldehyde, 20 ccs. of ethyl alcohol and 3 drops of piperidine for about 40 minutes on a water bath. An oil separated out which was collected and warmed with ethyl alcohol. A yellow solid was produced which was filtered off, washed with ethyl alcohol and water and again with ethyl alcohol and finally with ether leaving light brown crystals melting at 173° C. with decomposition.

Example XVI 13.8 gms. of 1-methylbenzoxazole-methiodide were mixed with 7.8 gms. of quinoline-2-aldehyde, 7.2 gms. of anhydrous sodium acetate and 200 ccs. of ethyl alcohol and the mixture was heated on a water bath for about ¾ hour and partly evaporated. The yellow solution obtained was allowed to stand and cool when a crystalline solid separated out. This solid was filtered off and washed with ethyl alcohol and water, and again with ethyl alcohol and finally with ether leaving 7 gms. of yellow brown crystals melting at 214° C. with decomposition.

The following general method illustrates the method adopted for the preparation of the quinoline-2-aldehydes employed in the above examples:

7.9 gms. of quinaldine were mixed with 30 ccs. of xylene and heated to 135° C. on an oil bath. 8.3 gms. of selenium dioxide were then added gradually in small quantities during a period of about 20 minutes and the mixture was maintained at a temperature of 120° C. for about 15 minutes, and then allowed to cool. The selenium formed during the reaction was filtered off and the filtrate was steam distilled. The xylene was distilled off first fairly rapidly and then when the nature of the distillate and the rate of distillation changed, the receiver was changed and the distillate which solidified in the receiver was collected and purified.

A similar method was adopted for the preparation of quinoline-4-aldehyde but using lepidine in place of quinaldine.

I claim:

1. A process which comprises condensing a quinoline-2-aldehyde with a rhodanine in the presence of a basic condensing agent while heating.

2. A process which comprises condensing a quinoline-2-aldehyde with a rhodanine in the presence of piperidine while heating.

3. A process which comprises condensing a quinoline-2-aldehyde with an N-alkyl rhodanic acid in the presence of a basic condensing agent while heating.

4. The compound of the general formula:

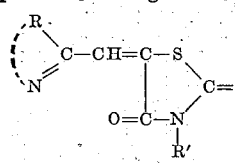

wherein R constitutes the atoms necessary to complete a quinoline nucleus and R' constitutes a member taken from the group consisting of hydrogen, alkyl, aryl and aralkyl groups.

5. A process which comprises condensing quinoline-2-aldehyde with an N-alkyl rhodanic acid in the presence of piperidine while heating.

6. A process as set forth in claim 5 wherein N-methyl rhodanic acid is used.

7. A process as set forth in claim 5 wherein N-ethyl rhodanic acid is used.

8. A process which comprises condensing quinoline-2-aldehyde with rhodanic acid in the presence of a basic condensing agent while heating.

9. A new compound of the formula:

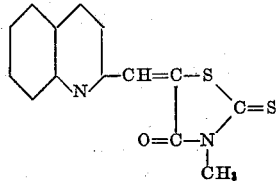

10. A new compound of the formula:

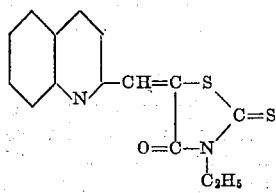

11. A new compound of the formula:

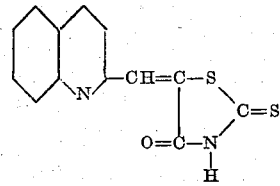

JOHN DAVID KENDALL.